United States Patent
Dai et al.

(10) Patent No.: US 9,298,383 B2
(45) Date of Patent: *Mar. 29, 2016

(54) MEMORY WITH MIXED CELL ARRAY AND SYSTEM INCLUDING THE MEMORY

(75) Inventors: Bing Dai, Ossining, NY (US); Chung H. Lam, Peekskill, NY (US); Jing Li, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 319 days.

This patent is subject to a terminal disclaimer.

(21) Appl. No.: 13/587,976

(22) Filed: Aug. 17, 2012

(65) Prior Publication Data
US 2014/0052895 A1    Feb. 20, 2014

(51) Int. Cl.
| | | |
|---|---|---|
| G06F 12/00 | (2006.01) | |
| G06F 3/06 | (2006.01) | |
| G06F 12/02 | (2006.01) | |
| G06F 1/32 | (2006.01) | |
| G06F 9/50 | (2006.01) | |

(52) U.S. Cl.
CPC ............ *G06F 3/0625* (2013.01); *G06F 1/3225* (2013.01); *G06F 1/3275* (2013.01); *G06F 3/0631* (2013.01); *G06F 3/0653* (2013.01); *G06F 3/0679* (2013.01); *G06F 9/5016* (2013.01); *G06F 12/02* (2013.01); *Y02B 60/1225* (2013.01)

(58) Field of Classification Search
CPC ... G06F 3/0625; G06F 3/0631; G06F 3/0653; G06F 3/0679; G06F 12/02; G06F 1/3225; G06F 1/3275; G06F 9/5016; Y02B 60/1225

USPC .................................................. 711/103, 154
See application file for complete search history.

(56) References Cited

U.S. PATENT DOCUMENTS

| | | | |
|---|---|---|---|
| 6,899,938 B2 | 5/2005 | Flynn | |
| 7,254,059 B2 | 8/2007 | Li et al. | |
| 7,375,365 B2 | 5/2008 | Hsiung | |
| 7,488,968 B2 | 2/2009 | Lee | |
| 7,696,503 B2 | 4/2010 | Lung et al. | |
| 8,484,534 B2* | 7/2013 | Olbrich et al. | ................ 714/763 |
| 2003/0165111 A1 | 9/2003 | Flynn | |
| 2006/0077706 A1 | 4/2006 | Li et al. | |
| 2006/0077741 A1 | 4/2006 | Wang et al. | |

(Continued)

OTHER PUBLICATIONS

SLC vs. MLC: An Analysis of Flash Memory, Super Talent, 2008.

(Continued)

*Primary Examiner* — Matthew Bradley
(74) *Attorney, Agent, or Firm* — Law Office of Charles W. Peterson, Jr.; Louis J Percello, Esq.

(57) ABSTRACT

A memory system, system including the memory system and method of reducing memory system power consumption. The memory system includes multiple memory units allocable to one of a number of processor units, e.g., processors or processor cores. A memory controller receives requests for memory from the processor units and allocates sufficient space from the memory to each requesting processor unit. Allocated memory can include some Single Level per Cell (SLC) memory units storing a single bit per cell and other memory units storing more than one bit per cell. Thus, two processor units may be assigned identical memory space, while half, or fewer, than the number of cells of one are assigned to the other.

23 Claims, 4 Drawing Sheets

(56) References Cited

U.S. PATENT DOCUMENTS

| | | |
|---|---|---|
| 2006/0097239 A1 | 5/2006 | Hsiung |
| 2006/0249725 A1 | 11/2006 | Lee |
| 2006/0257787 A1 | 11/2006 | Kuo et al. |
| 2007/0249083 A1 | 10/2007 | Li et al. |
| 2007/0274121 A1 | 11/2007 | Lung et al. |
| 2008/0185575 A1 | 8/2008 | Hsiung |
| 2009/0040814 A1 | 2/2009 | Kang et al. |
| 2009/0073754 A1 | 3/2009 | Bae et al. |
| 2009/0080242 A1 | 3/2009 | Resta et al. |
| 2009/0111249 A1 | 4/2009 | Lee |
| 2009/0244963 A1 | 10/2009 | Karpov et al. |
| 2010/0110779 A1 | 5/2010 | Liu et al. |
| 2010/0151652 A1 | 6/2010 | Lung et al. |
| 2010/0165712 A1 | 7/2010 | Bedeschi et al. |
| 2012/0169480 A1* | 7/2012 | Jantunen et al. ........... 340/10.51 |

OTHER PUBLICATIONS

R. F. Freitas et al., Storage-class memory: The next storage system technology, IBM J. Res. & Dev. vol. 52 No. 4/5 Jul./Sep. 2008.

* cited by examiner

MEMORY WITH MIXED CELL ARRAY AND SYSTEM INCLUDING THE MEMORY

CROSS-REFERENCE TO RELATED APPLICATIONS

The present application is related to U.S. patent application Ser. No. 13,587,967, "MEMORY CONTROLLER FOR MEMORY WITH MIXED CELL ARRAY AND METHOD OF CONTROLLING THE MEMORY" to Bing Dai et al., filed coincident herewith, assigned to the assignee of the present invention and incorporated herein by reference.

BACKGROUND OF THE INVENTION

1. Field of the Invention

The present invention is related to shared memory, and more particularly, to memory shared by multiple processors and efficient allocation and use of the memory by the processors.

2. Background Description

Semiconductor technology and chip manufacturing advances have resulted in a steady increase of Central Processing Unit (CPU), or processor, processing power and memory performance, allowing packing more function in the same or smaller chip area, i.e., density. Generally, these densely packed chips are much more powerful and consume much more power for each given unit of chip area. Although a number of factors determine computer system performance, performance is primarily the result of the particular CPU and memory performance.

In theory X processors improve performance by a factor of X. So, a typical high performance computer system increases performance by increasing the number of processors, e.g., in a multiprocessor system, sharing correspondingly larger high-performance main memory as well. Both Intel® and Advanced Micro Devices (AMD), Inc., for example, offer off-the-shelf, multi-processors (multiple core processors) for PCs and the like, currently with as many as 8 cores. A state of the art high performance PC with such an 8-core multi-processor, for example, might be equipped with 32 gigabyte (32 GB) or more of main memory; some form of non-volatile storage, e.g., a Hard Disk Drive (HDD) or a Solid State Disk Drive (SSDD); a display capability (e.g., integrated on board); and, any additional feature cards. These multi-core processors have found use even in what was once considered low end, state of the art mobile applications, such as the iPhone® or iPad® from Apple, Inc.

While state of the art multi-core PCs may dedicate cache memory for each core, on or off chip or module, the cores share a much larger main memory. During normal operation each core may be running one or more applications in one or more threads and/or providing one or more virtual machines. As each application/processor thread opens the respective processor requests memory from the main memory, and usually receives a memory space allocation sufficient to satisfy the request. Although processor speed is the main performance determinant, a fast processor can only take full advantage of its speed with equally fast memory. For example, one rule of thumb is that replacing relatively slow memory in a Personal Computer (PC) with higher performance memory, e.g., 30-50% faster, improves average performance by 10-20%.

A typical memory controller for such main memory (PC or mobile device) is selected/designed to treat all memory in main memory identically. So, if memory on one Dual Inline Memory Module (DIMM) is slower than the others, the controller operates all of the DIMMs at that the slower speed. For example, for 4 DIMMs with 3 capable of 800 ns bus speeds and 1 only capable of 500 ns bus speeds, the controller would run all 4 at 500 ns. These state of the art systems also have allocated memory to all processors/cores for all applications/threads regardless of individual application/thread performance requirements. As a system user opened more and more, the concurrent activity and memory allocation could rise to a point that tended to stress shared memory capabilities.

Adding memory and function in older technologies also had increased power requirements, much of which has increased integration has alleviated. In older PCs, for example, adding many functions required adding system boards, e.g., sound, a Network Interface card or Circuit (NIC), modem and a display adapter. These functions have been integrated into single on-board (on motherboard) chips or parts of chips, to reduce overall system power. Also, disk drives have required significant power, much of which can be eliminated by using SSDDs. SSDDs use well known Non-Volatile Random Access Memory (NVRAM) or flash memory as hard disk space. SSDDs have improved non-volatile storage (disk) performance to near Dynamic RAM (DRAM) performance. In mobile devices where both size and power are constrained, among other things by mobile device package size, battery life, and minimal cooling capacity, much lower power NVRAM has replaced high performance, high power DRAM.

While technology has reduced power required for individual function, adding more and more function has increased system power requirements. So for example, an eight core processor consumes on the order of one hundred twenty five watts (125 W) and system RAM consumes another 30 W. While memory chip capacity normally quadruples with each generation, at times system memory requirements have outpaced chip capacity increases. Without a change in technology generation, increasing main memory capacity has involved adding more memory chips/DIMMs to the system.

As noted hereinabove, adding components (DIMMs) increases space requirements and power consumption. The more power that system components consume, the higher the power supply capacity required and the more the system requires costly cooling components. Kingston® Technology, for example, offers water-cooled high-performance DIMMs. This all adds to system cost.

Thus, there is a need for reducing system main memory real estate and power consumption and more particularly increasing system main memory capacity and density while reducing system memory real estate and power consumption.

SUMMARY OF THE INVENTION

A feature of the invention is lower power main memory;

Another feature of the invention is lower cost, denser main memory in a multi-processor system;

Yet another feature of the invention is memory allocated to processors in a multi-processor system such that denser memory is allocated unless an application requires less dense, higher performance memory;

The present invention relates to a memory system and system including the memory system. The memory system includes multiple memory units allocable to one of a number of processor units, e.g., processors or processor cores. A memory controller receives requests for memory from the processor units and allocates sufficient space from the memory to each requesting processor unit. Allocated memory can include some memory units storing a single bit per cell and other memory units storing more than one bit per cell. Some or all of the memory may be selectable as either Single Level per Cell (SLC) or Multiple Level per Cell (MLC). Thus, two processor units may be assigned identical memory space, while half, or fewer, than the number of cells of one are assigned to the other.

One embodiment is a method of reducing memory system power consumption comprising: providing a plurality of memory units sharing a common memory space, said plurality of memory units comprising: at least one performance memory unit storing a single bit per cell, and at least one dense memory unit storing a selected number of n bits in each cell, such that each performance memory unit consumes at least n times as much power per bit as each of said dense memory units; providing a memory controller allocating requested memory space in said plurality of memory units to a requesting device, said memory controller allocating dense memory and selectively including a performance memory portion; and receiving a density indication with each memory access, said density indication indicating whether performance memory or dense memory is being accessed.

In this embodiment, providing said plurality of memory units comprises providing storage class memory (SCM). Providing said at least one performance memory unit comprises providing dynamic random access memory (DRAM), said at least one dense memory unit comprising said SCM unit. Receiving said density indication comprises: receiving a single bit per cell indication from DRAM; and receiving an n bits per cell indication from SCM. Receiving said density indication comprises: receiving a Single-Level Cell (SLC) indication from at least one SCM unit; and receiving a Multi-Level Cell (MLC) memory from at least one other SCM. Providing said plurality of memory units comprises configuring SCM units, at least one SCM unit being configured a Single-Level Cell (SLC) memory, and at least one other SCM unit being configured a Multi-Level Cell (MLC) memory.

Another embodiment is a method of reducing system power consumption comprising: receiving a request for memory from one of a plurality of processing units; allocating memory from a plurality of memory units in a common memory space responsive to said request, said plurality of memory units comprising: at least one performance memory unit storing a single bit per cell, and at least one dense memory unit storing a selected number n of bits in each cell, each performance memory unit consuming at least n times as much power per bit as each of said dense memory units; requesting access to allocated memory; and receiving a density indication with each memory access request, said density indication indicating whether said memory access request is for performance memory or dense memory.

In this embodiment, memory units comprise at least one storage class memory (SCM) unit. Performance memory may comprise dynamic random access memory (DRAM), with said dense memory comprising SCM, with receiving said density indication comprising: receiving a single bit per cell indication from DRAM; and receiving an n bits per cell indication from SCM. Otherwise, receiving said density indication comprises: receiving a Single-Level Cell (SLC) indication from at least one SCM unit; and receiving a Multi-Level Cell (MLC) memory from at least one other SCM; with allocating said memory further comprises configuring SCM units, said at least one SCM unit being configured SLC memory, and said at least one other SCM unit being configured a MLC memory. The system may further comprise: a Network Interface Circuit (NIC) capability coupled to said plurality of processing units; a user interface coupled to said plurality of processing units; a multimedia capability coupled to said plurality of processing units; and one or more peripheral ports coupled to said plurality of processing units.

Another embodiment is a method of reducing system power consumption comprising: receiving a request for memory from one of a plurality of processing units; allocating memory in a common memory space responsive to said request, said allocated memory comprising: dynamic random access memory (DRAM), and storage class memory (SCM) storing a selected number n bits in each cell, each DRAM unit consuming at least n times as much power per bit as each said SCM unit; requesting access to allocated memory; and receiving a density indication with each memory access request, said density indication indicating whether said memory access request is for DRAM or SCM. The method may further comprising: communicating over a memory bus between said plurality of processing units, said system memory and said memory controller coupled to said memory bus; and said plurality of processing units further selectively communicating with: a Network Interface Circuit (NIC) capability, a user interface, a multimedia capability, and one or more peripheral ports.

Another embodiment is a method of reducing system power consumption comprising: receiving a request for memory from one of a plurality of processing units; allocating memory responsive to said request in a plurality of storage class memory (SCM) units sharing a common memory space, said plurality of SCM units comprising: a plurality of Single-Level Cell (SLC) memory units storing a single bit per cell, and a plurality of Multi-Level Cell (MLC) memory units storing n of bits in each cell, each SLC memory unit consuming at least n times as much power per bit as each of said MLC memory units; requesting access to allocated memory; and receiving a density indication with each memory access request, said density indication indicating whether said memory access request is for SLC or MLC.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
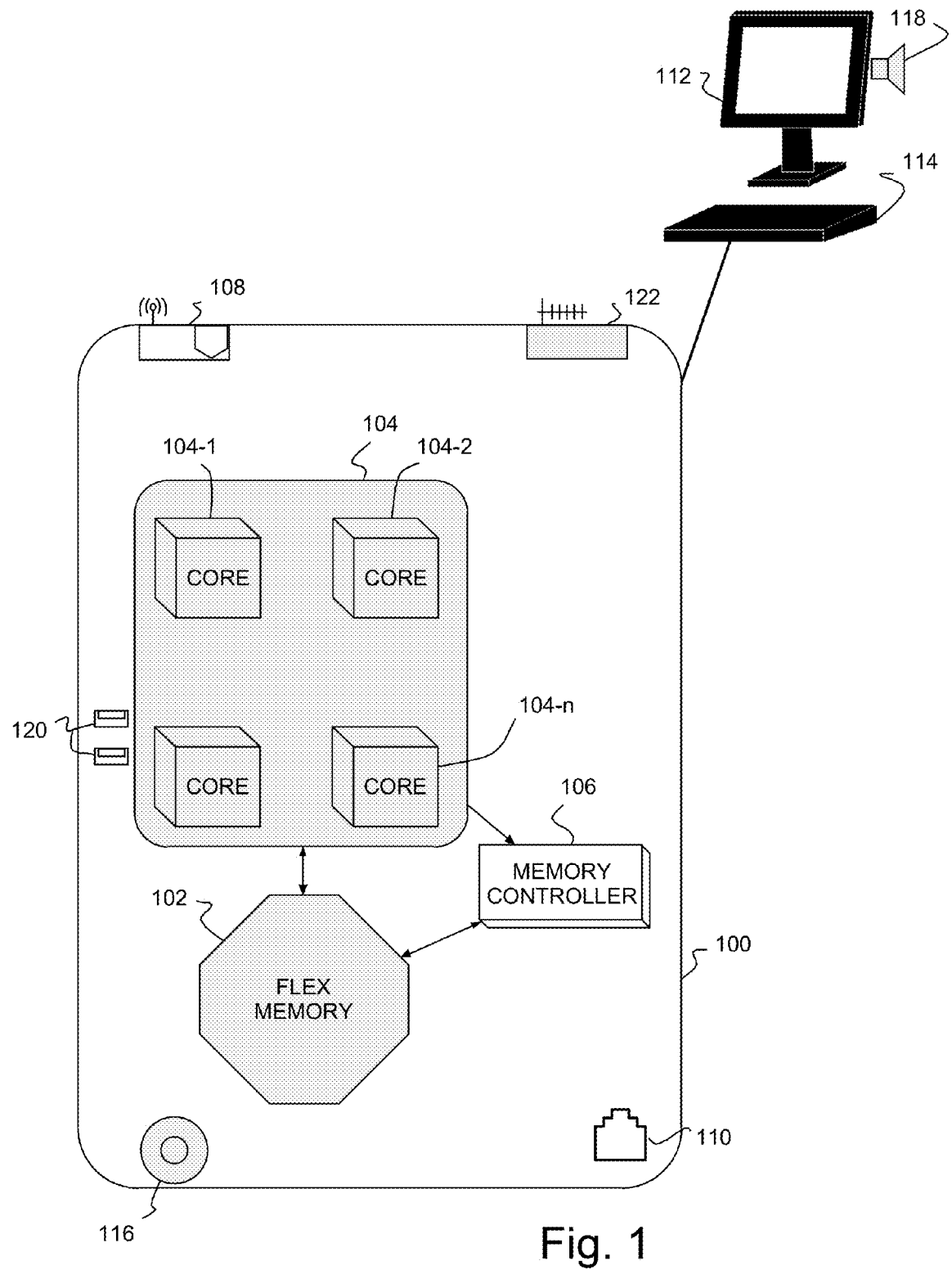
FIG. 1 shows an example of a system with main, mixed cell memory that is architected according to a preferred embodiment of the present invention.

Turning now to the drawings and more particularly, FIG. 1 shows an example of a system 100 with main memory that is mixed cell Random Access Memory (RAM) 102 architected according to a preferred embodiment of the present invention. In this example, the system 100 includes in a single multi-core processor 104 with multiple processors or cores 104-1, 104-2, ..., 104-n sharing mixed cell RAM 102. A memory controller 106 allocates memory to each processor 104-1, 104-2, ..., 104-n, based on application/thread performance requirements.

The system 100 may be any suitable information handling system or device, such as, for example, a main frame computer, a Personal Computer (PC), a laptop computer, or a hand held device, e.g., a tablet computer, a Personal Digital Assistant (PDA) or a smart phone. The preferred mixed cell RAM 102 includes a mix of memory with a performance range and density variety that may be selected based on performance over density; and/or cost (higher density) over performance, as further described hereinbelow. Thus for example, two processors or cores, e.g., 104-1 and 104-2 may have identical memory space allocated, while half the number of cells or fewer assigned to one are assigned to the other.

Preferably, the system 100 includes a memory controller 106 managing memory allocation and memory access according to application/thread needs, such as described in to U.S. patent application Ser. No. 13,587,967, "MEMORY CONTROLLER FOR MEMORY WITH MIXED CELL ARRAY AND METHOD OF CONTROLLING THE MEMORY" to Bing Dai et al., filed coincident herewith, assigned to the assignee of the present invention and incorporated herein by reference. The memory controller 106 allocates both high performance memory and dense memory to each core 104-1, 104-2, ..., 104-n, depending on thread performance requirements. So, the memory controller 106 allocates sufficient less dense, higher performance memory primarily to cores 104-1, 104-2, ..., 104-n, with performance-critical threads or applications. Otherwise the memory controller 106 allocates denser, lower performance (and lower cost) memory, to cores 104-1, 104-2, ..., 104-n, for data intensive applications or threads.

A preferred system 100 also may include a number of optional functions or capabilities. So, in this example, the system 100 includes a wireless or wired Network Interface Circuit (NIC) capability 108 and/or a telephone interface 110, e.g., a NIC chip or function on part of a chip or module, and a land line modem or a cellular (3G or 4G) modem. A user interface includes a display 112 and a manual input capability 114, e.g., individually or combined in a touch screen. A multimedia capability may include an audio input capability 116, e.g., a microphone, and an audio output capability 118, e.g., speakers. The system 100 may also include one or more peripheral ports, e.g., Universal Serial Bus (USB) or High-Definition Multimedia Interface (HDMI) ports 120 and built-in or added Bluetooth 122.

Figure 2:
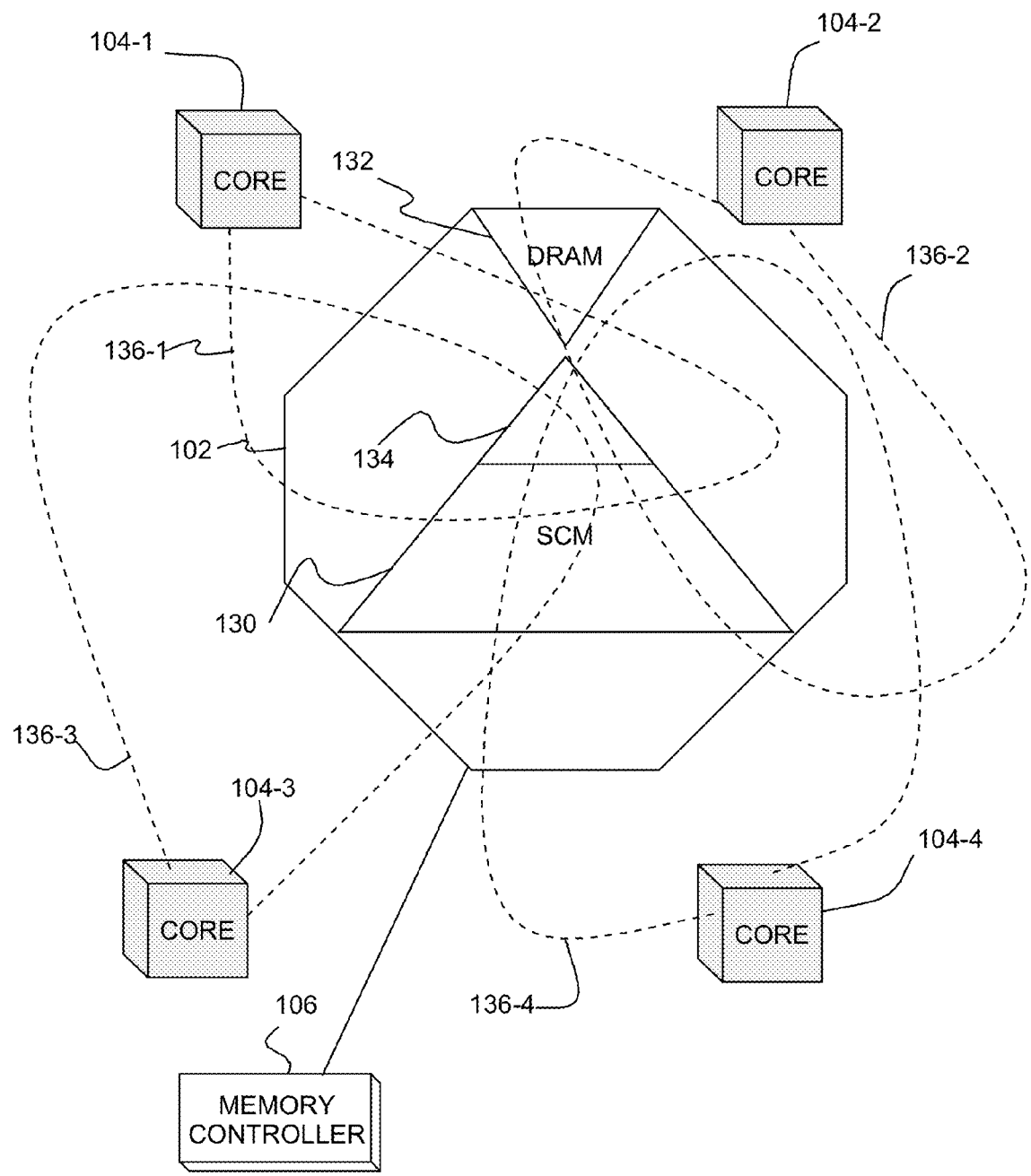
FIG. 2 shows an example of organization of preferred mixed cell memory with a variety of memory, that vary with a range of performance and density.

As shown in the example of FIG. 2, preferred mixed cell RAM 102 includes a variety of memory, varying with a range of performance and density. Thus, the preferred mixed cell RAM 102 includes bulk memory 130, which may be lower performance, dense (low cost) storage, e.g., Storage-Class Memory (SCM) such as is normally used, for example, in thumb drives or Solid State Disk Drives (SSDDs), including flash memory or Non-Volatile RAM (NVRAM). Also, preferred mixed cell RAM 102 includes performance memory, i.e., higher performance, less dense memory that also may be SCM 134. Optionally, the performance memory may include traditional high performance RAM, such as Dynamic RAM (DRAM) 132 or Static RAM (SRAM, not shown).

The memory controller 106, interfaces the cores (in this example 4 cores 104-1, 104-2, 104-3 and 104-4) with the mixed cell RAM 102. The memory controller 106 has assigned 136-1, 136-2, 136-3, 136-4 memory to each core 104-1, 104-2, 104-3, 104-4, based on the application(s)/thread(s) now active in each core and the requirements of each application/thread. Further, SRAM, DRAM and SCM typically all have different access and write times. So, the memory 130, 132, 134 in the mixed cell RAM 102 has location dependent performance. The memory controller 106 interfaces each core 104-1, 104-2, 104-3, 104-4 with assigned 136-1, 136-2, 136-3, 136-4 memory 130, 132, 134 insuring control matches location performance, e.g., read and write set up, hold and any handshake protocol.

Figure 3:
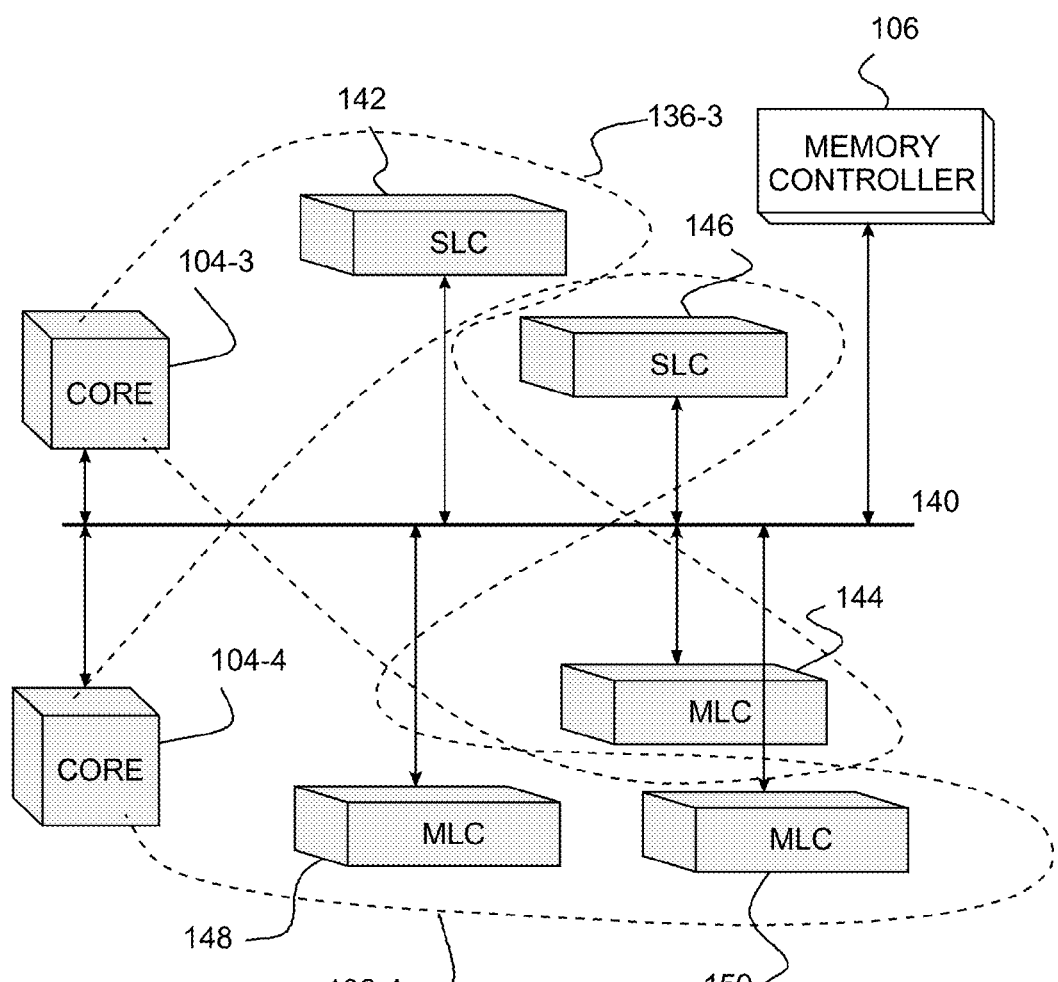
FIG. 3 shows an example of assignment of shared mixed cell memory to cores.

FIG. 3 shows an example of preferred mixed cell RAM 102 assigned 136-3, 136-4 to cores 104-3, 104-4 with reference to FIGS. 1 and 2 with like elements labeled identically. In this example the cores 104-3, 104-4 communicate with SCM 142, 144, 146, 148, 150 (in 130, 134) and memory controller 106 over memory bus 140. In this example, the memory controller 106 has previously assigned 136-3 memory 142, 144 to core 104-3, and assigned 136-4 memory 146, 148, 150 to core 104-4. Preferably, the SCM includes Single-Level Cell (SLC) flash memory 142, 146 and denser Multi-Level Cell (MLC) flash memory 144, 148, 150. In one embodiment, the SLC units 142, 146 and MLC units 144, 148, 150 have fixed, unchangeable architecture, i.e., SLC memory is designed as SLC memory and MLC memory is designed as MLC memory, and segments are selected and assigned based on expected needs. In another embodiment, all units 142, 144, 146, 148, 150 are configurable/selectable as SLC or MLC, and the memory controller 106 designates each as SLC or MLC upon allocating each to a core 104-1, 104-2, 104-3, 104-4.

Arrays of different types of memory (e.g., DRAM, SRAM, SCM) in the preferred mixed cell RAM 102 may be integrated with support as units on one or more common chips or segregated on dedicated chips. Preferably, the preferred mixed cell RAM 102 is as compact as possible without sacrificing system level performance for density. Preferably also, to accommodate the particular processor 104 architecture, depending on the processor interface, the mixed cell memory 100 is organized multiple bits wide; and more preferably, multiple bytes wide to accommodate the memory bus 140. So, for example, memory bus 140 is 32 or 64 bit wide, with units in one or more addressable banks The mixed cell RAM 102 array (i.e., the cell array) may have all cells on a single chip or multiple chips, with SRAM/DRAM and storage class memory segregated or intermingled. SCM may be, for example, Phase Change Memory (PCM), Resistive RAM (RRAM) or any suitable non-volatile, rewriteable storage. Further, the SCM 130, 134 may be variable density memory with cells being selectable/reconfigurable as single bit (142, 145) or as multiple bit (144, 148, 150) per cell, as selected/designated by the memory controller 106.

Figure 4:
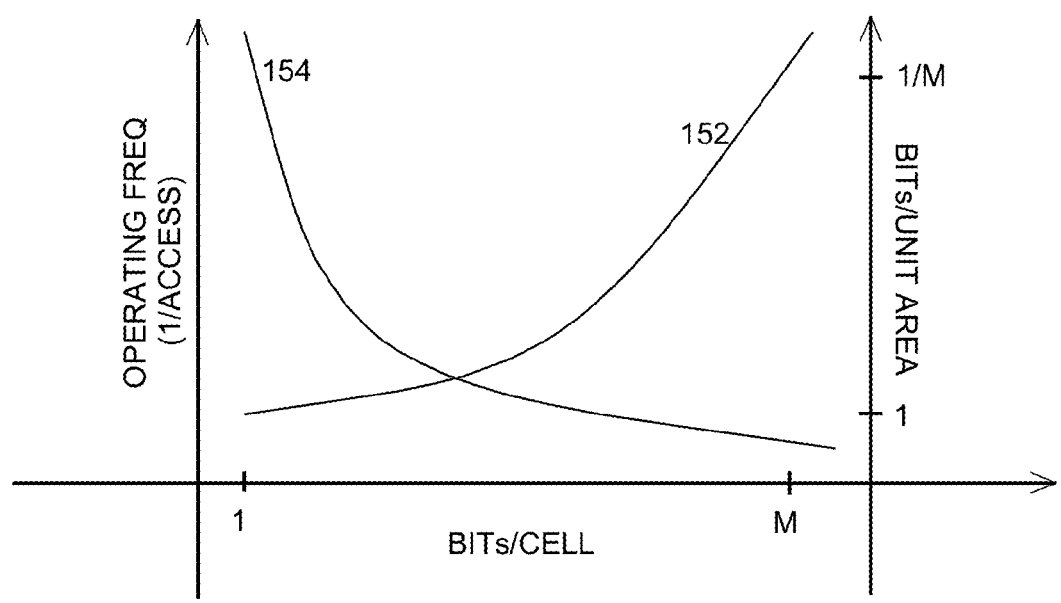
FIG. 4 shows the tradeoff of density and performance for SCM cells.

FIG. 4 shows a comparison of the tradeoff of density 152 (e.g., in bits, megabits, gigabits, etc., per unit area) and performance 154 (operating frequency, e.g., the number of successive accesses (one read and one write) per second) for SCM cells. From this it is apparent that one trades performance for density. The variable density memory in SCM 130, 134 includes reconfigurable support circuits, e.g., sense amplifiers and write heads or circuits that are configurable for the particular selected storage configuration. When selected as SLC memory 142, 146, the cells program coarsely with two states, programmed and unprogrammed or erased. Detecting one state, e.g., the programmed state, may be designated as detecting a logic one ("1"); and, detecting the other state, the erased or unprogrammed state, is designated detecting as a logic zero ("0"). Reading the contents of, as well as storing data in, the MLC memory 144, 148, 150 is somewhat more complex and takes somewhat more time.

Figure 5:
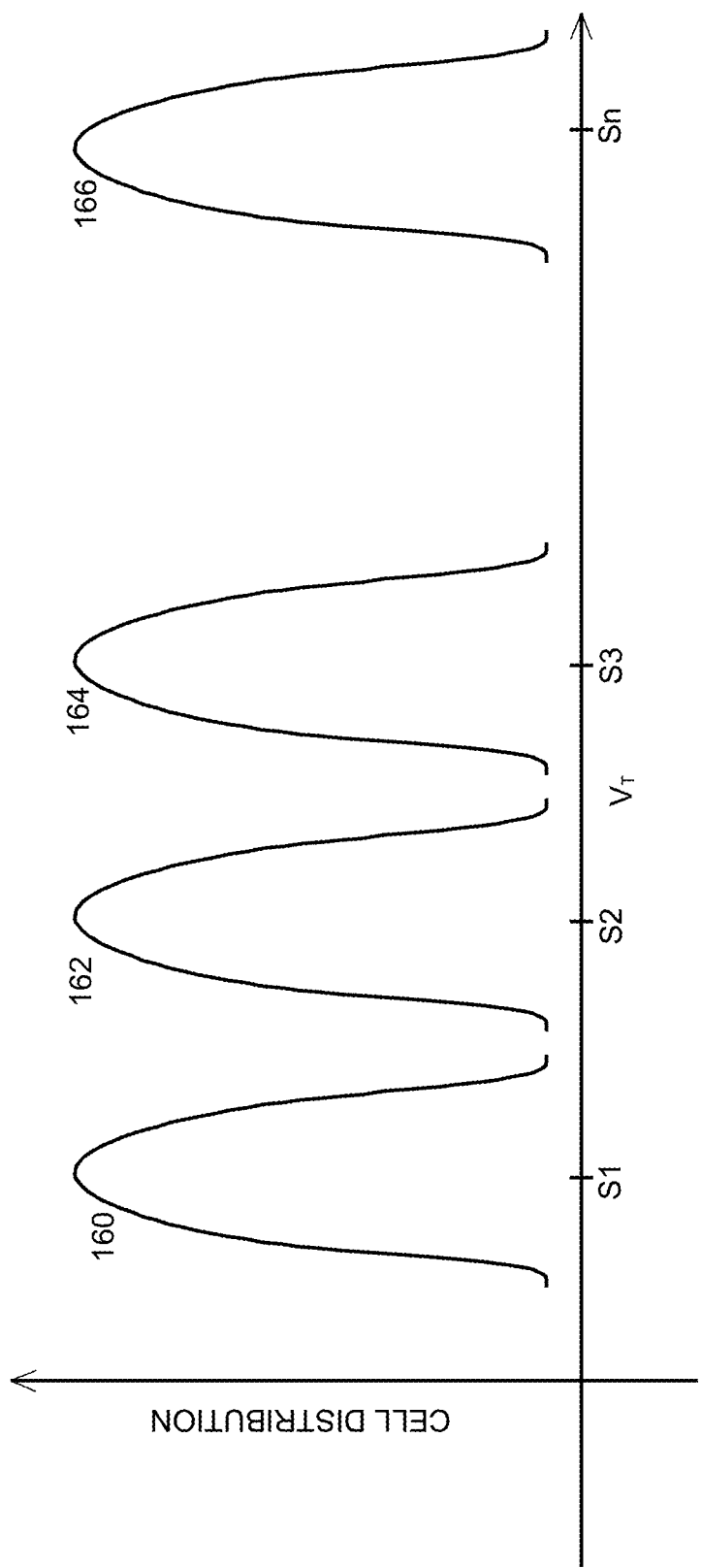
FIG. 5 shows an example of ranges identifying a number of preferred multi-level cell programmable states.

FIG. 5 shows an example of programmed threshold ranges 160, 162, 164, 166, that may be used to identify a number (n, where n=$2^m$) of preferred multi-level cell programmable states S1, S2, S3, . . . , Sn, e.g., the programmed threshold distribution for cells across a chip. Each MLC stores m bits and may include, for example, a single storage device with a programmable variable threshold voltage ($V_T$) that may be programmed to fall in one of the ranges 160, 162, 164, 166. Typically, both reading and writing one of the n states can take several times, e.g., n times, longer than for an SLC.

Similarly, variable resistors in programmable resistance cells, for example, are varied to one of n resistances, or variable capacitor in programmable capacitance cells are varied to one of n capacitances. Sensing what is stored in each type of cell may be determined by how long a load on each takes to reach a particular voltage, e.g., for a variable resistor to charge/discharge a fixed capacitance or for a fixed resistance to charge/discharge a variable capacitor. Thus, how m bits are stored in each cell depends on the particular storage media. So, when a preferred N mega cell array is selected as SLC, it stores N Megabits (Mb); and when it is selected as MLC, it stores m*N MB.

Optionally, the preferred memory controller 106 may further program cells for 2n, 4n, 8n, . . . states. The reconfigurable sense amplifiers sense single bit contents when the cells are selected as SLC; and, sense the n states and encode the results to indicate all m bits when the same cells are selected as MLC. Similarly, the cell write heads are selectable as single bit, two state (programmed and unprogrammed) writing for SLC; and for decoding m bits into one of the n states and writing that state for MLC.

Advantageously, instead of allocating identical physical memory to every processor in a multiprocessor system, regardless of requirements of active applications or threads in the processors, higher performance memory is allocated where needed according to the present invention and denser memory is allocated everywhere else. Because the preferred mixed cell memory includes memory with a range and variety selectable for performance, fewer memory cells (i.e., a smaller array) serve a larger memory space that would otherwise merit a much larger conventional memory. Processors may be assigned identical memory space, for example, with half the number of cells or fewer of assigned one processor than are assigned to other processors.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. A memory system comprising:
    a plurality of memory units in a common memory space sharable by a plurality of devices, wherein said common memory space is main memory, said plurality of memory units comprising:
        at least one performance memory unit storing a single bit per cell, and
        at least one dense memory unit storing more than one bit per cell; and
    a memory controller allocating requested memory space in said plurality of memory units to a requesting device, allocated memory space selectively including a performance memory portion and a dense memory portion, said memory controller selecting said plurality of memory units based on application/thread performance requirements, wherein said plurality of memory units comprise at least one storage class memory (SCM) unit, and each of said plurality of memory units comprises a plurality of memory cells.

2. A memory system as in claim 1, wherein said at least one performance memory unit comprises at least one dynamic random access memory (DRAM) unit for performance threads, said at least one dense memory unit being for data intensive threads and comprising one or more of said at least one SCM unit.

3. A memory system as in claim 2, wherein for at least one said requesting device is one processor sharing main memory with other processors in a multiprocessor system, and for each requesting processor allocated memory space comprises:
    at least one DRAM array unit; and
    at least one SCM array unit.

4. A memory system as in claim 1, wherein said plurality of memory units are SCM units, at least one SCM unit being a Single-Level Cell (SLC) memory for performance threads, and at least one other SCM unit being a Multi-Level Cell (MLC) memory for data intensive threads.

5. A memory system as in claim 1, wherein said at least one SCM array unit comprises a plurality of SCM array units, each of said plurality of SCM array units being selectable as Single-Level Cell (SLC) memory for performance threads or Multi-Level Cell (MLC) memory for data intensive threads.

6. A system comprising:
    a plurality of memory units in a common memory space, wherein said common memory space is main memory, said plurality of memory units comprising:
        at least one performance memory unit including a plurality of cells storing a single bit per cell, and
        at least one dense memory unit including a plurality of multi-bit cells storing more than one bit per cell;
    a plurality of processing units sharing said common memory space, each selectively requesting system memory space in said common memory space; and
    a memory controller allocating requested memory space in said plurality of memory units to a requesting processing unit, allocated memory space selectively including a performance memory portion and a dense memory portion, said memory controller selecting said plurality of memory units based on application/thread performance requirements, said plurality of memory units comprise at least one storage class memory (SCM) unit.

7. A system as in claim 6, wherein said at least one performance memory unit comprises at least one dynamic random access memory (DRAM) unit for performance threads, said at least one dense memory unit comprising at least one SCM unit for data intensive threads.

8. A system as in claim 7, wherein for at least one said requesting processing unit said allocated ones comprise:
    at least one DRAM array unit; and
    at least one SCM array unit.

9. A system as in claim 6, wherein said plurality of memory units are SCM units, at least one SCM unit being a Single-Level Cell (SLC) memory, and at least one other SCM unit being a Multi-Level Cell (MLC) memory.

10. A system as in claim 6, wherein said at least one SCM array unit comprises a plurality of SCM array units, each of said plurality of SCM array units being selectable as Single-Level Cell (SLC) memory or Multi-Level Cell (MLC) memory.

11. A system as in claim 6, further comprising a memory bus, said plurality of processing units, said system memory and said memory controller being coupled to, and communicating with one another over, said memory bus.

12. A system as in claim 11, further comprising:
a Network Interface Circuit (NIC) capability coupled to said plurality of processing units;
a user interface coupled to said plurality of processing units;
a multimedia capability coupled to said plurality of processing units; and
one or more peripheral ports coupled to said plurality of processing units.

13. A system as in claim 6, wherein said plurality of processing units comprise a plurality of cores in a multi-core microprocessor, said common memory space being shared by said plurality of cores.

14. A system as in claim 6, wherein said plurality of processing units comprise a plurality of individual processors, said common memory space being shared by said plurality of individual processors, and dense memory units store a selected number of n bits in each cell and each performance memory unit consumes at least n times as much power per bit as each of said dense memory units.

15. A system comprising:
a main memory with a plurality of memory units sharing a common memory space, said plurality of memory units comprising:
at least one dynamic random access memory (DRAM) unit including a plurality of DRAM cells, and
at least one storage class memory (SCM) unit including a plurality of multi-bit cells and storing a selected number of n bits in each cell, each DRAM unit consuming at least n times as much power per bit as each of said SCM units;
a plurality of processing units, each selectively requesting system memory space in said main memory; and
a memory controller allocating requested memory space in said plurality of memory units to a requesting processing unit based on application/thread performance requirements, allocated memory space selectively including DRAM for performance threads and SCM for data intensive threads.

16. A system as in claim 15, further comprising:
a memory bus, said plurality of processing units, said main memory and said memory controller being coupled to, and communicating with one another over said memory bus;
a Network Interface Circuit (NIC) capability coupled to said plurality of processing units;
a user interface coupled to said plurality of processing units;
a multimedia capability coupled to said plurality of processing units; and
one or more peripheral ports coupled to said plurality of processing units.

17. A system as in claim 15, wherein said plurality of processing units comprise a plurality of cores in a multi-core microprocessor.

18. A system as in claim 15, wherein said plurality of processing units comprise a plurality of individual processors.

19. A system comprising:
a main memory with a plurality of storage class memory (SCM) units in a common memory space, said plurality of SCM units comprising:
a plurality of Single-Level Cell (SLC) memory units including a plurality of cells storing a single bit per cell, and
a plurality of Multi-Level Cell (MLC) memory units including a plurality of multi-bit cells storing of n bits in each cell, each SLC memory unit consuming at least n times as much power per bit as each of said MLC memory units;
a plurality of processing units, each selectively requesting system memory space in said main memory; and
a memory controller allocating requested memory space in said plurality of memory units to a requesting processing unit based on application/thread performance requirements, allocated memory space selectively including a SLC memory portion for performance threads and a MLC memory portion for data intensive threads.

20. A system as in claim 19, wherein said plurality of SCM array units are selectable as said SLC memory units for performance threads or said MLC memory units for data intensive threads.

21. A system as in claim 20, further comprising:
a memory bus, said plurality of processing units, said main memory and said memory controller being coupled to, and communicating with one another over said memory bus;
a Network Interface Circuit (NIC) capability coupled to said plurality of processing units;
a user interface coupled to said plurality of processing units;
a multimedia capability coupled to said plurality of processing units; and
one or more peripheral ports coupled to said plurality of processing units.

22. A system as in claim 21, wherein said plurality of processing units comprise a plurality of cores in a multi-core microprocessor.

23. A system as in claim 21, wherein said plurality of processing units comprise a plurality of individual processors.

* * * * *